(12) United States Patent
Kato

(10) Patent No.: US 6,556,735 B1
(45) Date of Patent: Apr. 29, 2003

(54) OPTICAL INTEGRATED MODULE

(75) Inventor: Tomoaki Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/720,713

(22) PCT Filed: Jul. 1, 1999

(86) PCT No.: PCT/JP99/03553

§ 371 (c)(1),
(2), (4) Date: Dec. 28, 2000

(87) PCT Pub. No.: WO00/02072

PCT Pub. Date: Jan. 13, 2000

(30) Foreign Application Priority Data

Jul. 3, 1998 (JP) .......................................... 10-188374

(51) Int. Cl.$^7$ ................................................ G02B 6/12
(52) U.S. Cl. ............................ 385/14; 385/31; 385/32; 385/50
(58) Field of Search ............................ 385/14, 15, 24, 385/31, 32, 49, 50

(56) References Cited

FOREIGN PATENT DOCUMENTS

| EP | 0 851 548 | 7/1998 |
| JP | 3-103805 | 4/1991 |
| JP | 11-191656 | 7/1999 |

OTHER PUBLICATIONS

A. Jourdan et al., "WDM Networking Experiment Including All–Optical Crossconnect Cascade and Transmission over 320 km G. 652 Fibre at up to 10 Gbit/s," *European Conference on Optical Communication*, ECOC '96, Proceeding, V.4, Oslo, pp. 123–126.

Ogawa et al. "Hybrid Integrated Four–Channel SS–SOA Array Module Using Planar Lightwave Circuit Platform," *Electronic Letters*, vol. 34, No. 4, pp. 361–363, Feb. 19, 1998.

Ogawa et al. "8–Channel High Speed Optical Wavelength Filter Module Using Hybrid Integrated 1.55μSS–SOA Gate Array," *Compilation of Presentations Made at the 1998 Electronic Information Communications Association General Conference; Electronics 1, SC–3–3*, pp. 457–458, Mar. 6, 1998.

Hanayamadi et al. Compilation of Physics Related Presentations for Use in the Aromatics 45$^{th}$ Session; 3$^{rd}$ Edition, p. 1143, Mar. 28, 1998.

Gyokkan et al. "Compilation of Presentations Made at the 1998 Electronic Information Communications Association General Conference; Electronics 1," p. 408, Mar. 6, 1998.

*Primary Examiner*—Rodney Bovernick
*Assistant Examiner*—Juliana K. Kang
(74) *Attorney, Agent, or Firm*—Young & Thompson

(57) ABSTRACT

To provide an optical integrated module that can eliminate an influence that unguided optical signal given rise to due to discontinuities between optical waveguides which is essentially inevitable in hybrid photonic integration exerts optical switching performance, adjacent angled optical waveguide portions on both incident and emission facets of an optical waveguide of an optical waveguide device are formed so as to get bent toward the same side with respect to a straight line in the longitudinal direction of an optical waveguide platform, and an input optical waveguide and an output optical waveguide of the optical waveguide platform are also formed so as to get bent toward the same direction corresponding with the bending of the optical waveguide of the optical waveguide device. Unguided optical signal which is given rise to at the time of wave-guiding from the input optical waveguide to the optical waveguide device is launched into the output optical waveguide at a deep angle exceeding an effective aperture for the output optical waveguide so that a crosstalk component for the output optical waveguide is controlled. Consequently, it becomes possible that only optical coupling efficiency for unguided optical signal is selectively and extremely effectively controlled while deterioration in coupling efficiency for the optical signal is suppressed to be as small as possible.

15 Claims, 12 Drawing Sheets

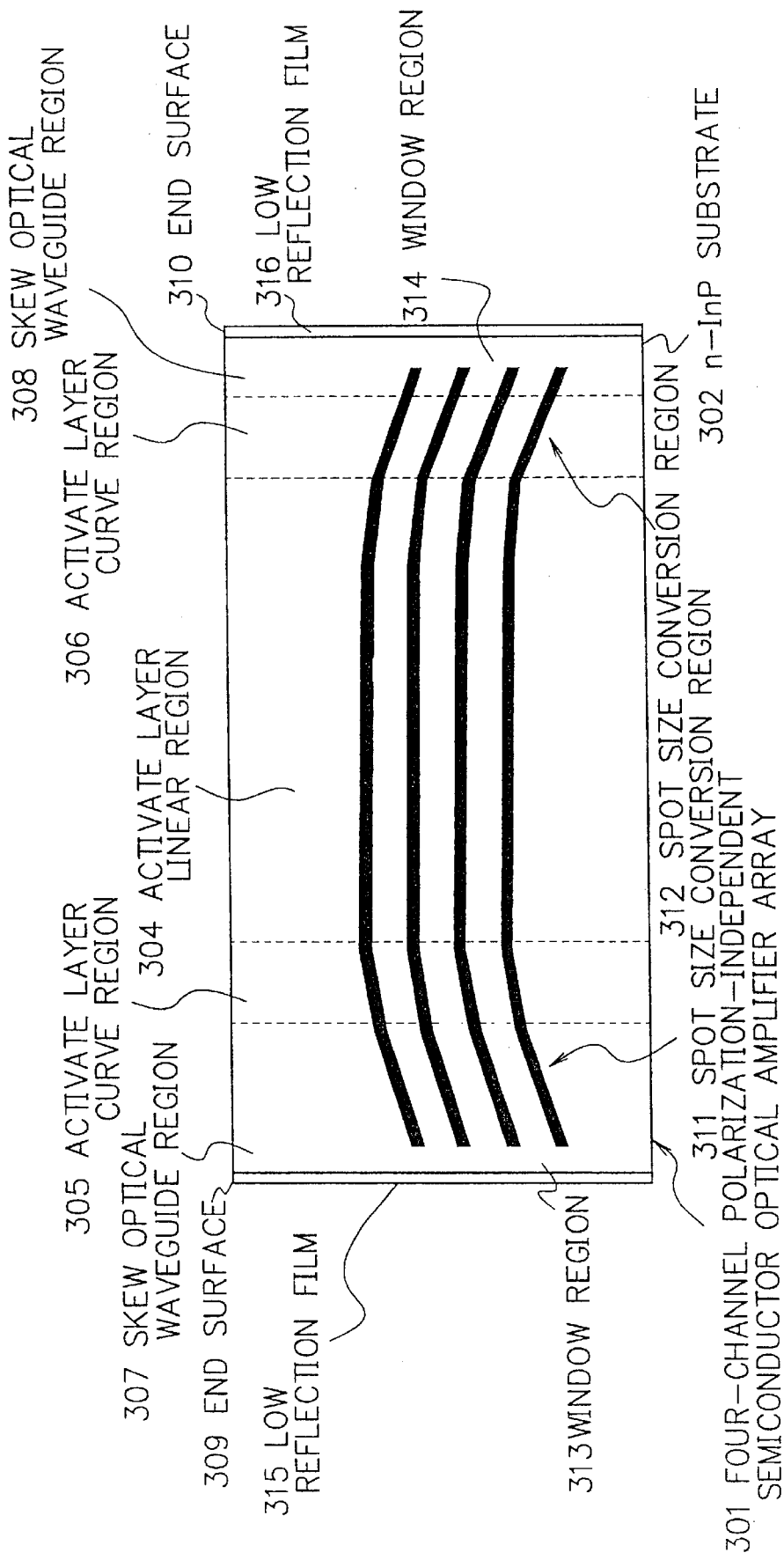
F I G. 6

OPTICAL INTEGRATED MODULE

The present invention relates to an optical integrated module created with hybrid photonic integration technology, and in particular relates to an optical integrated nodule configured by disposing an optical waveguide device between an input optical waveguide and an output optical waveguide.

BACKGROUND ART

As communication demand shifts from low speed service lead by telephones to broadband digital multimedia service, development of an optical ATM switching equipment having a high speed and high throughput for efficiently multiplexing whole these communication services and an optical switch having a high speed and excellent expandability as mainstay thereof is desired. Among all, a distribution selective optical switch configured by combining a one-input one-output high speed optical gate device and an optical multiplexer-demultiplexer device together is controlled easily, and therefore application for such use is being studied. In order to realize such an optical switch network, excellent crosstalk suppressing performance for satisfying scalability, high speed switching performance, and simple control system appropriate for speeding-up is required. Therefore, as this high speed optical gate, an optical gate device (SOAG) using semiconductor optical-amplifier (SOA) which has extremely high ON/OFF performance around 40 dB to 70 dB and can compensate loss of the optical multiplexer-demultiplexer device, and can be expected to respond at high speed of the order of nanosecond (nsec) is catching attention. In addition, in such a system that a number of such optical devices are used, costs as well as implementation load that these occupy the whole system cannot be ignored. Therefore, expectation toward a photonic integrated circuit (Photonic IC: PIC) which brings a plurality of optical devices into monosilic integration on one substrate and realizes a particular function and a photonic/electric integrated module that brings periphery electronic circuit devices, etc. for driving optical devices into integral integration is heightening. In particular, a hybrid optical integrated module in which a semiconductor optical device is implemented on an optical waveguide platform is expected as photonic integration technology that is closest to practical use from a point of view of its productivity, etc.

FIG. 10 is a plan block diagram showing an example thereof, in which an optical waveguide device 101 such as SOAG, having an optical waveguide 102 linked with the above described respective optical waveguides 104 and 105 are mounted on an optical waveguide platform 103 on which an input optical waveguide 104 and an output optical waveguide 105. In this hybrid photonic integrated device, the input optical signal 107 emitted into the input optical waveguide 104 is wave-guided through the input optical waveguide 104 and inputted to the optical waveguide device 101, and after being wave-guided through the optical waveguide 102, is wave-guided through the output optical waveguide 105 and is outputted as a core optical signal 108.

In the case where the optical integrated module on which the above described SOAG is mounted by application of hybrid photonic integration technology, in order to compensate a coupling loss due to relatively large optical waveguide discontinuity as between the input optical waveguide 104 and the optical waveguide 102 of the optical waveguide device 101 or between the optical waveguide 102 and the output optical waveguide 105, or a branching loss of the optical multiplexer-demultiplexer device, SOAG itself is required to have a large optical signal gain. Thus, measures to control residual facet reflection as much as possible is required to be taken, and therefore, angled facet structure in which the optical waveguide is bent in the vicinity of the light incident and emission facet obliquely toward this facet, or alternatively a window structure that discontinues the active stripe (active layer) immediately in front of the facet, etc. are proposed. For example, in FIG. 11, taken is such a configuration that toward the incident direction of the input optical signal 117 as well as the emitting direction of the output optical signal 118, the input optical waveguides 114 as well as the output optical waveguides 115 are inclined at a required angle and following this, portions connected with at least the input optical waveguides 114 and the output optical waveguides 115 in the optical waveguides 112 provided in the optical waveguide device 111.

However, in the hybrid optical integrated module shown in these FIG. 10 and FIG. 11, the optical signals to be emitted into the optical waveguide devices 101 and 111 subject to wave-guiding through the input optical waveguides 104 and 114 become unguided optical signal component which do not attribute to optical coupling in majority thereof in comparatively major discontinuity of optical waveguide between the input optical waveguide and the optical wave-guide device. This unguided optical signal component is brought into coupling again in the region of discontinuity of the optical waveguide in the optical waveguide devices 101 and 111 and the output optical waveguides 105 and 115, and this remarkably deteriorates overall ON/OFF performance toward optical signal of the optical gate device module. That is, majority of the unguided optical signals at the light incident side of the optical waveguide devices 101 and 111 are caused to go straight forward subject to gradual diversion like a beam in the substrate of the optical waveguide device 101 and 111 to reach the facet of the optical waveguide at the emitting side in the opposite side. Thus, the unguided optical signal(s) is (are) coupled into the output optical waveguides 105 and 115 existing in the vicinity thereof at a certain rate. This phenomenon becomes a cause to deteriorate the optical characteristics of the optical integrated module, in particular the ON/OFF characteristics of the optical signal in the optical gate device module such as, SOAG. Such an ON/OFF introduces coherent cross talk (beat noise) in optical signals and remarkably spoil the characteristics of the optical modules.

Particularly in case of an optical waveguide array device, such problems may be structurally caused by the fact that the emitting position of the unguided optical signals to be extremely closer to the emitting optical waveguide of another channel. For example, as shown in FIG. 12, in the case where the angled facet (angled facet) of the output optical waveguide 125 is formed in parallel along the angled facet of the input optical waveguide 124, since actually almost all of them is formed in point symmetry due to convenience in manufacturing, as a consequence, the propagation axis of the unguided optical signal (unguided signal) between the input optical waveguide 124 and the optical waveguide device 121 corresponds with an angle which is most apt to get coupled with the output optical waveguide 125. This introduces remarkable deterioration in inter-channel crosstalk suppressing characteristics.

In order to control such leakage of unguided optical signals, such measures that improve coupling loss so as to control occurrence of unguided optical signals themselves are first necessary. However, it is essentially impossibly to make coupling loss into zero in a hybrid optical integrated module, and a new device indeed for not coupling the unguided optical signal component as mulch as possible will rather become more important. However, it is the current state that none that can tolerate for practical use as a method to remove such unguided optical signal component effectively has been realized yet.

An object of the present invention is to provide an optical integrated module that has enabled to get rid of influence that the unguided optical signal given rise to due to discontinuity of optical waveguide essentially inevitable in hybrid photonic integration affects optical switching performance.

DISCLOSURE OF THE INVENTION

The present invention is an optical integrated module comprising an optical waveguide platform 133 on which an input optical waveguide 134 and an output optical waveguide 135 have been respectively formed and an optical waveguide device 131 which is mounted on the above described optical waveguide platform 131 between the above described input optical waveguide 134 and the output optical waveguide 135, and moreover is brought into optical coupling with the above described input optical waveguide 134 and the output optical waveguide 135, and is characterized in that the above described input optical waveguide 134 and the output optical waveguide 135, and the optical waveguide 132 of the above described optical waveguide device 131 which is brought into optical coupling with these optical waveguides have been bent in the region of these optical couplings respectively toward the same side with respect to a straight line oriented in the direction of optical waveguiding of the above described optical waveguide platform 133. In more particular, characteristics are that the above described input optical waveguide 134, the output optical waveguide 135 and the optical waveguide device 131 are disposed in such a positional relationship that a certain limited gaps are provided between the above described input optical waveguide 134 and the above described optical waveguide device 131, and between the above described output optical waveguide 135 and the above described optical waveguide device 131 respectively so that discontinued portions of optical waveguides are formed between them, and moreover the above described input optical waveguide 134, the optical waveguide 132 of the optical waveguide device 131 and the output optical waveguide 135 respectively comprise portions which have been respectively bent at a gentle curvature to such an extent that radiation of optical signals to be guided can be sufficiently ignored, and moreover each of the above described input optical waveguide 134, the output optical waveguide 135, and the optical waveguide 132 have been bent in the same direction in the vicinity of the above described discontinuity of the optical waveguide toward a straight line in the longitudinal direction of the above described optical waveguide platform 133 to comprise angled facet structure.

In the optical integrated module according to the present invention, the optical waveguide 132 on both incident and emission both facets of the optical waveguide device 131 is formed so as to get bent toward the same side along the straight line in the longitudinal direction of the optical waveguide platform 133, and the input optical waveguide 134 and the output optical waveguide 135 of the optical waveguide platform 133 are also formed so as to get bent toward the same direction along the bending of the above described optical waveguide 132, and thereby the direction of the longitudinal axis of the output optical waveguide 135 does not correspond with the wave-guiding axis of the unguided optical signal in the input optical signal 137 to be given rise to between the input optical waveguide 134 and the optical waveguide device 131, and the unguided optical signal intersects at such a deep angle as approximately twice the set angle of angled optical waveguide toward the output optical waveguide 135. Therefore, the unguided optical signal is emitted into the output optical waveguide 135 at a deep angle exceeding an effective aperture for the output optical waveguide 135 so that the crosstalk component 139 is controlled to be guided to the output optical waveguide 135. Consequently, it becomes possible that only optical coupling efficiency for unguided optical signal is selectively and extremely effectively controlled while deterioration in coupling efficiency for the optical signal is suppressed to be as small as possible.

BRIEF DESCRIPTION OF THE DRAWINGS

FIG. 6 is a plan block diagram showing an optical waveguide device in the second embodiment;

BEST MODE FOR CARRYING OUT THE INVENTION

Figure 1:
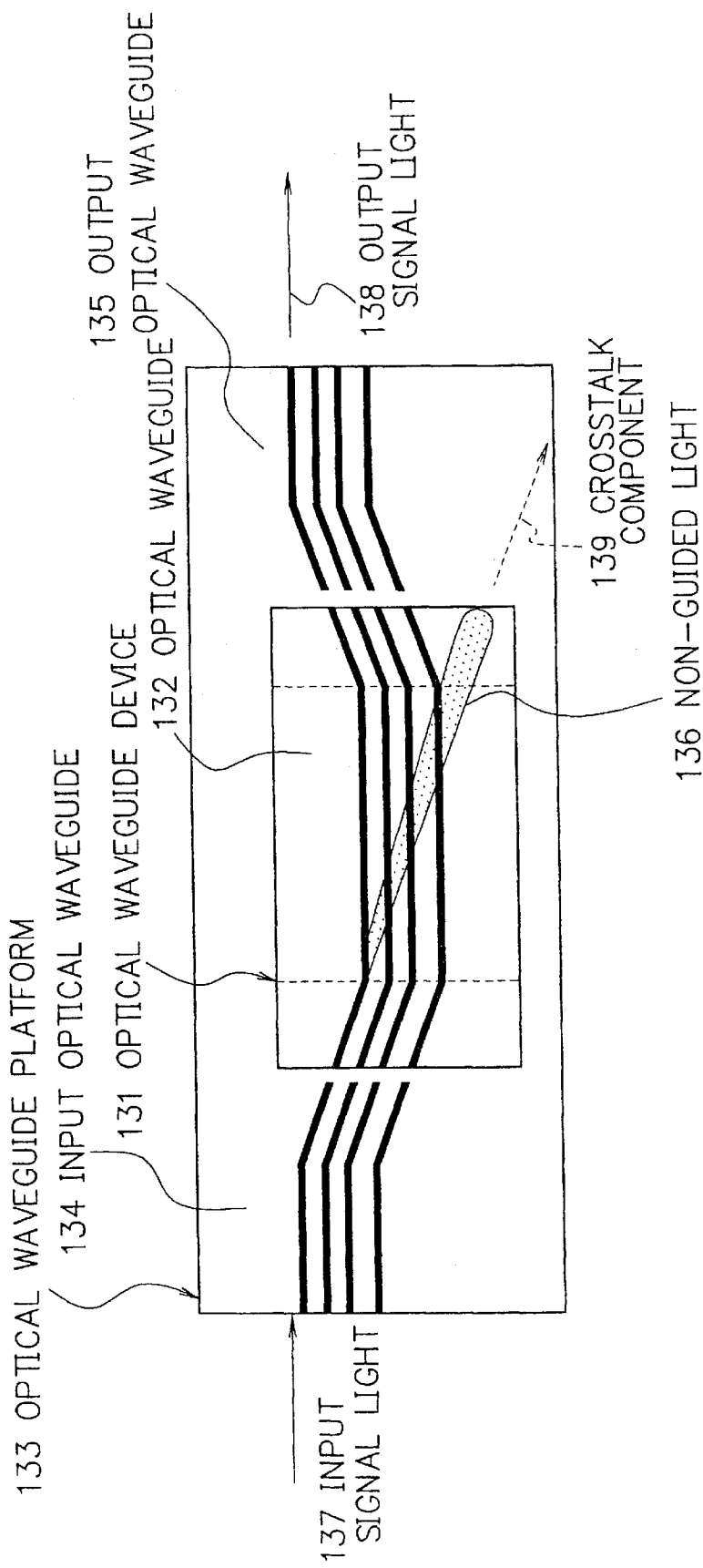
FIG. 1 is a plan block diagram showing a basic configuration of an optical integrated module of the present invention.
Figure 2:
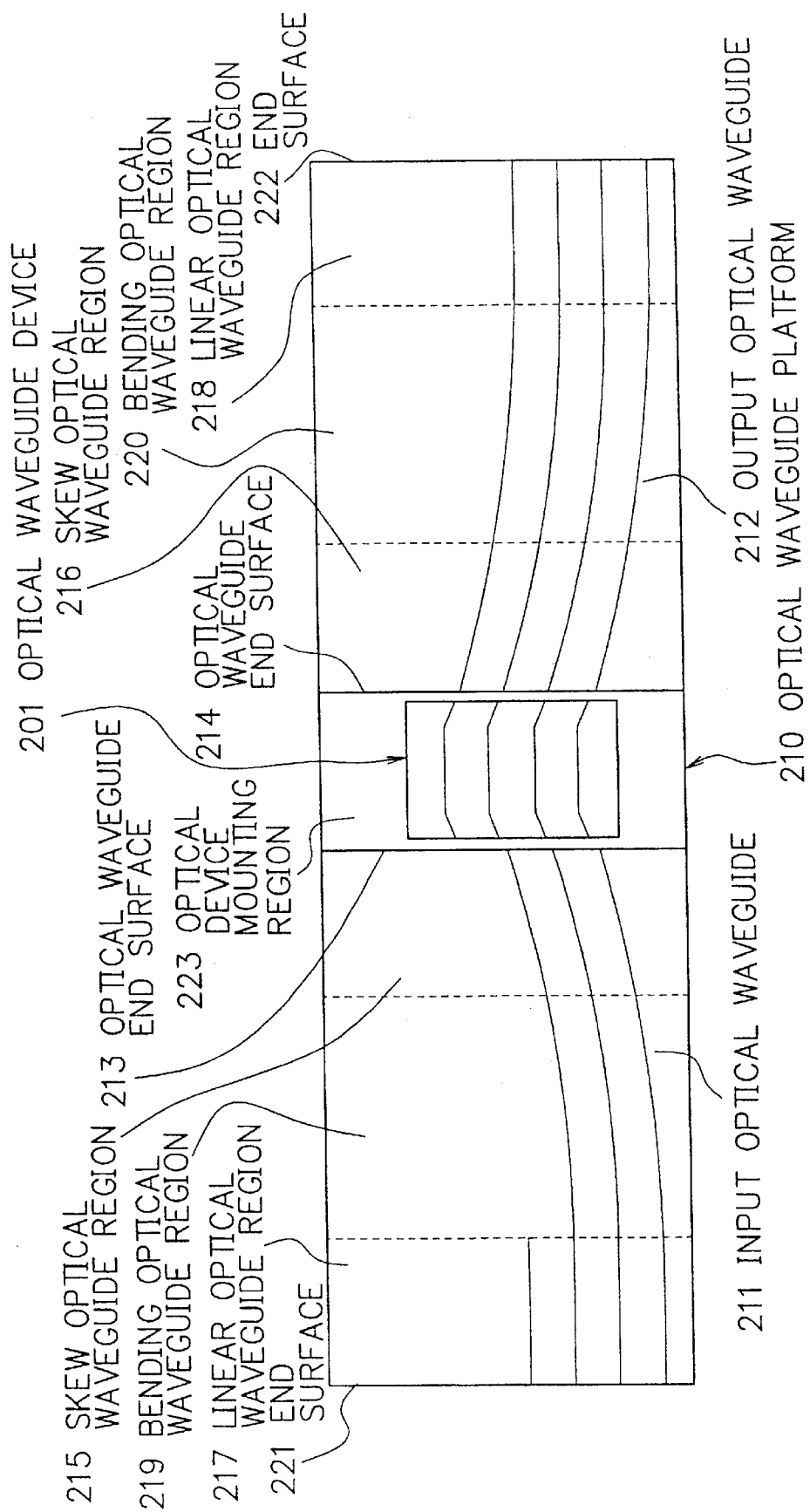
FIG. 2 is a plan block diagram showing an optical integrated module of a first embodiment of the present invention.

Next, embodiments of the present invention will be described with reference to drawings. FIG. 2 is a plan block diagram of a first embodiment of the present invention, and comprises, in a hybrid optical integrated module in which an optical waveguide device 201 comprising at least angled waveguide facet structures in its light incident-emission facets has been mounted on an optical waveguide platform 210, a configuration to control a unguided optical signal component which has given rise to with discontinuity of optical waveguide which takes place between the input optical waveguide 211 on the optical waveguide platform 210 and the light input facet of the optical waveguide device 201 will not be brought into coupling with the output optical waveguide 212 at the opposite side to become a crosstalk component.

Figure 3:
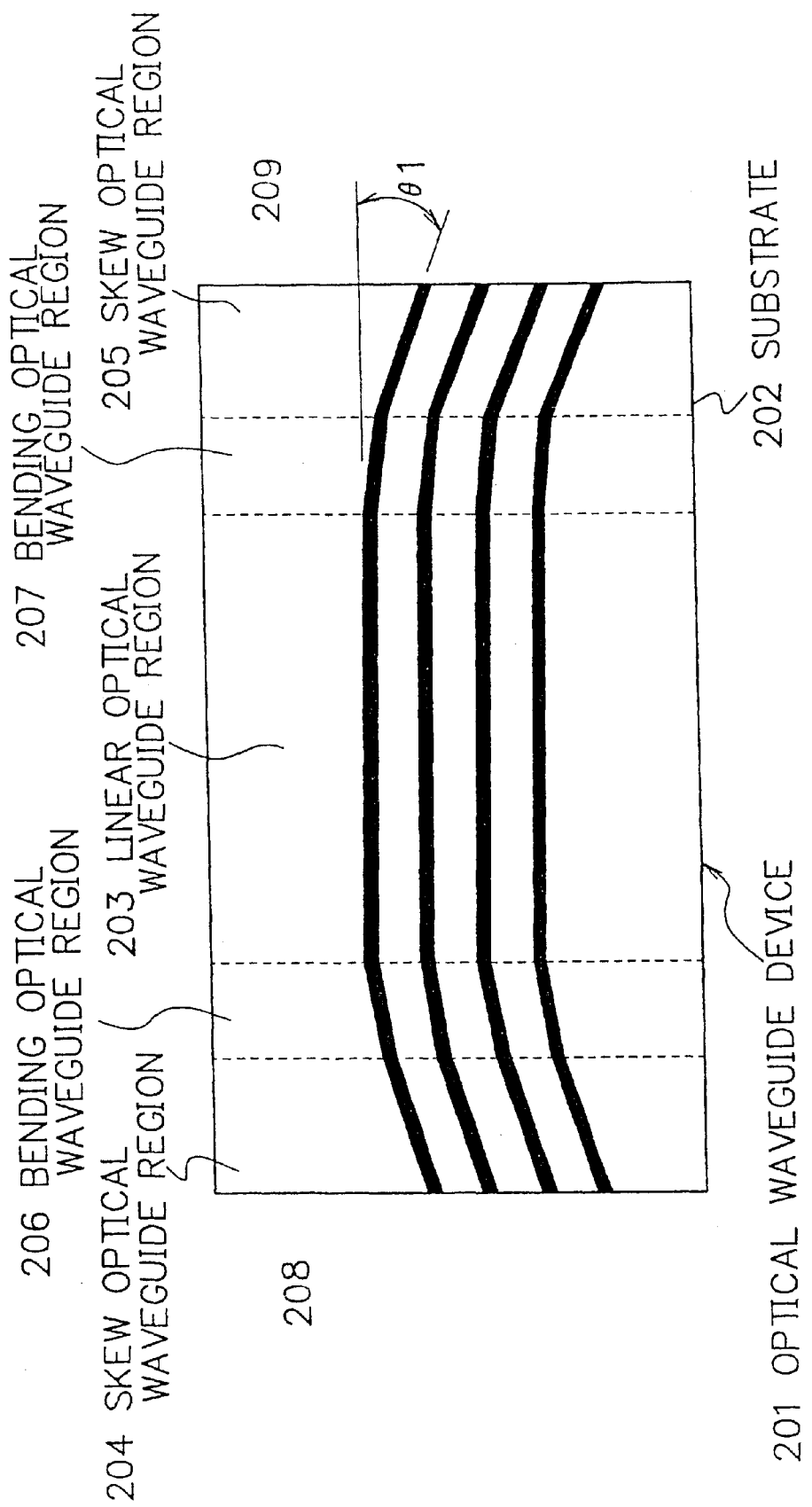
FIG. 3 is a plan block diagram showing an optical waveguide device in the first embodiment.

FIG. 3 is a plan block diagram of the above described optical waveguide device 201 to be photonic-modularized.

The above described optical waveguide device 201 comprises a straight optical waveguiding region 203 which is formed on a substrate 202, angled optical waveguide regions 204 as well as 205 which are bent with an angle θ1 inside a horizontal surface along the above described substrate 202 toward an longitudinal axis of this optical waveguide region 203 for a mutually same side and bending optical waveguide regions 206 and 207 comprising a curve optical waveguide with an appropriate curvature to such an extent that the above described straight optical waveguiding region 203 and the above described angled optical waveguide regions 204 and 205 can be brought into smooth connection and radiation influence can be ignored.

Figure 4:
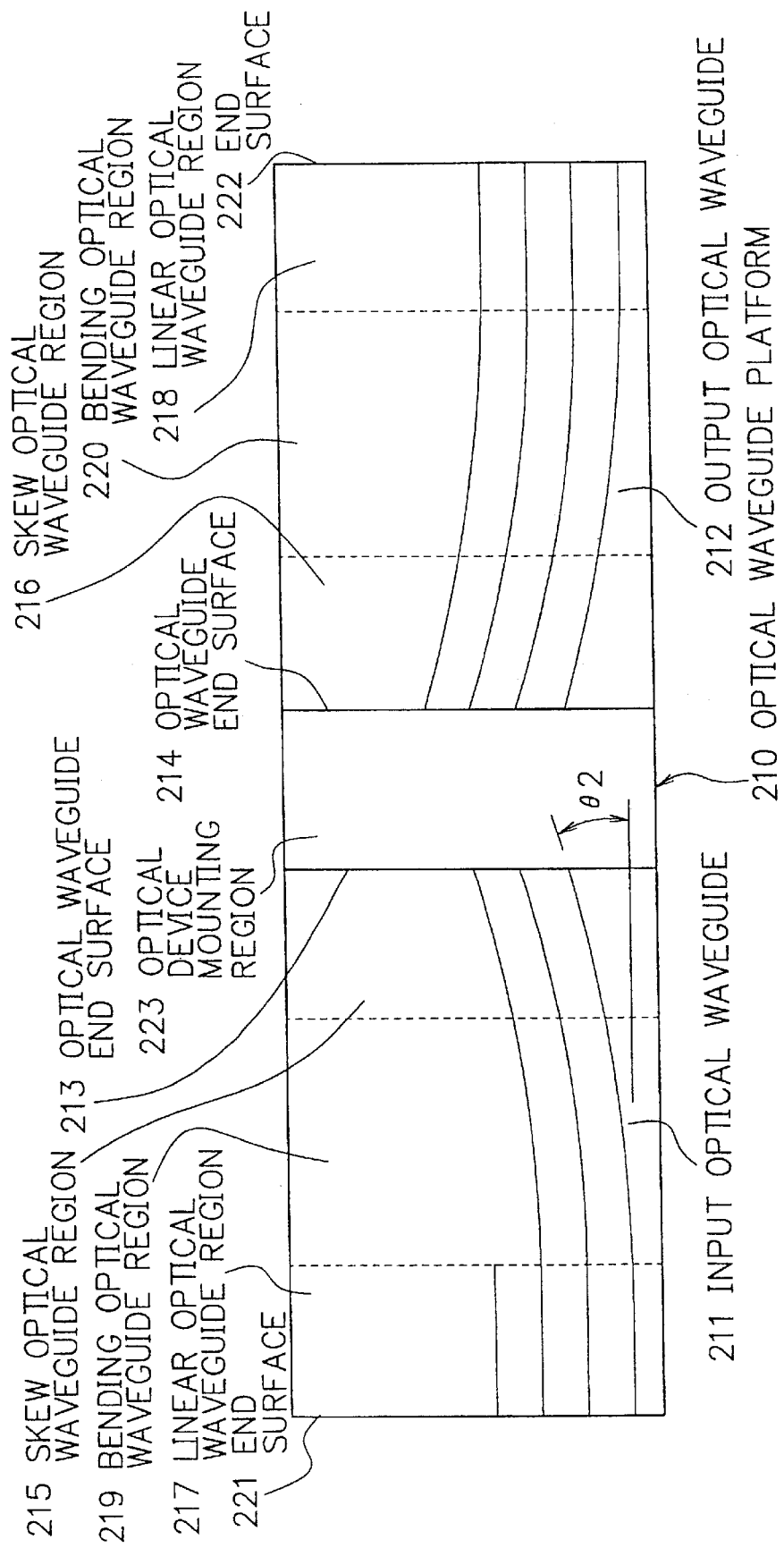
FIG. 4 is a plan block diagram showing an optical waveguide platform in the first embodiment.

FIG. 4 shows the above described optical waveguide platform 210 on which the above described optical waveguide device 201 is mounted. On the above described optical waveguide platform 210, formed are an input optical waveguide 211 as well as an output optical waveguide 212 which couple optical signals to the above described optical waveguide device 201 and, moreover, are made of material different from the above described optical waveguide device 201. These input optical waveguide 211 as well as output optical waveguide 212 respectively have angled optical waveguide regions 215 as well as 216 which incline with an angle θ2 toward optical waveguide facets 213 and 214 which couple to the above described optical waveguide device 201 and optical signals, straight optical waveguide regions 217 and 218 and bending optical waveguide regions 219 and 220 comprising a curve optical waveguide with an appropriate curvature to such an extent that the above described angled optical waveguide regions 215 and 216 and the above described straight optical waveguiding regions 217 and 218 can be brought into smooth connection respectively and radiation influence can be ignored. Incidentally, the above described angle θ2 is determined with the Snell's law based on an equivalent refractive index n1 of the above described angled optical waveguide 204 and 205, an equivalent refractive index n2 of the above described angled optical waveguide 215 and 216 and the above described angle θ1. Incidentally, the above described straight optical waveguide regions 217 and 218 extend to reach facets 221 and 222 of the above described optical waveguide platform 210. In addition, the above described optical waveguide device 201, which is provided with limited gaps between itself and the above described optical waveguide facets 213 and 214, is disposed on the above described optical waveguide platform 210.

Next, operation of an optical integrated module of a first embodiment shown in FIGS. 2 to 4 will be described. Firstly, basic transmission channel of optical signals in this optical integrated module will be described. An optical signal that has been emitted into an input optical waveguide 211 from a facet 221 reaches an optical waveguide facet 213 via bending optical waveguide region 219 and angled optical waveguide region 215 from a straight optical waveguide region 217. The optical signal which has been combined with the optical waveguide device 201 via a limited gap from here reaches the angled optical waveguide region 205 via bending optical waveguide region 206, the straight optical waveguide region 203, the bending optical waveguide region 207 from the angled optical waveguide region 202. In addition, from here to an output optical waveguide 212, signal emitted from a facet 222 via the optical waveguide facet 214, the angled optical waveguide region 216, the bending optical waveguide region 220 and the straight optical waveguide region 218 from the optical waveguide device 201 via a limited gap as in the incident side. Here, the angle optical waveguide regions 204 and 205 provided at the both ends of the optical waveguide device 201 function to efficiently reduce effective residual facet reflection on the facets 208 and 209. This is effective for controlling Fabry-Perot resonance of optical signals inside the optical waveguide device 201. Such a measure is particularly important in the case when an optical waveguide device itself has a gain as in a semiconductor optical-amplifier.

On the other hand, behavior of optical signal components which ended up without having been brought into coupling completely with this optical waveguide device 201 in discontinuity of optical waveguide between the input optical waveguide 211 and the optical waveguide device 201 will be described. Majority of optical signals which have been left out without being combined with the optical waveguide device 201 reach an output side optical waveguide facet 209 in the opposite side unguided optical signal which divert gradually in a beam-like fashion in the substrate 202 of the optical waveguide device 201 approximately toward a direction of a longitudinal axis of the angled optical waveguide region 202. At this time, in the optical integrated module of this embodiment, the angled optical waveguide regions 204 and 205 of the optical waveguide device 201 has got bent toward the same side together in the direction of a longitudinal axis of the straight optical waveguide 203.

As a result of this, no angled optical waveguides exist in the input side in the vicinity of the spot where the unguided optical signal reaches the emission side facet 209, and consequently, amplitudes of unguided optical signal in the vicinity of the facet of the angled light optical waveguide 212 in the output side are remarkably attenuated compared with those for the optical signals. Moreover, since trace of the diverged unguided optical signal largely deviate from the direction of longitudinal axis of angled light optical waveguide on the output side, appropriate design on configuration parameters inclusive of angle θ1 and θ2, etc. allows a ratio of this unguided optical signal coupled into the output optical waveguide to be orders of magnitude smaller compared with that of the optical signal. Thus, it becomes possible to provide a configuration that controls selectively as well as extremely only optical coupling efficiency for the unguided optical signal.

Figure 5:
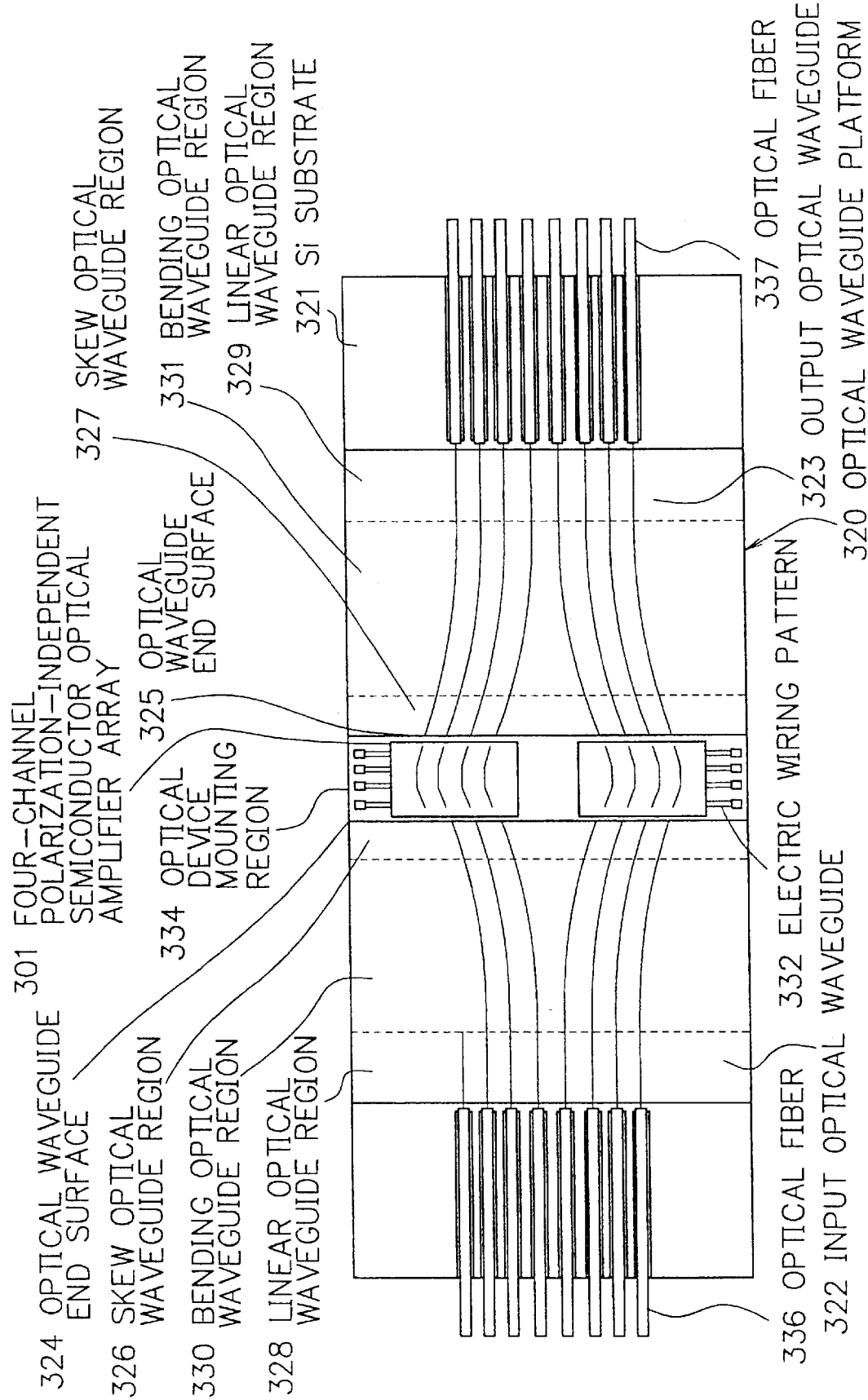
FIG. 5 is a plan block diagram showing an optical integrated module of a second embodiment of the present invention.

FIG. 5 is a plan block diagram of a second embodiment which the present invention has been applied to a hybrid optical integrated module of an array semiconductor optical-amplifier and which is configured by mounting 4-channel array semiconductor optical-amplifier 301 and optical fibers 336 and 337 onto a silica-based optical waveguide Si platform 320. FIG. 6 is a plan block diagram of the above described 4-channel array semiconductor optical-amplifier 301, and the above described semiconductor optical-amplifier 301 is configured by comprising 4-channel array semiconductor optical-amplifiers being disposed in every 250 micron ($\mu$m). Each semiconductor amplifier has a configuration that undope-InGaAsP bulk active stripe of wavelength composition 1.55 $\mu$m formed on a (001)n-InP substrate 302 has been buried with a p-InP clad layer. It is designed to become a single-mode optical waveguide for optical signal in 1.55 $\mu$m band, and to have optically amplifying function for the above described optical signals by injection of currents. In addition, in order to reduce polarization dependency (polarization sensitiveness) on optical signals, the height is set at 0.3 $\mu$m, and the width at 0.3 $\mu$m so that a sectional aspect ratio of the above described active stripe should be approximately 1:1.

Here, length of the device is 1000 $\mu$m, breaking therein down to 350 $\mu$m being length of the active stripe straight region 304 in which the above described active stripe is disposed in parallel along the [110] direction of the above described n-InP substrate 302, 100 μm at the both ends thereof being the length of active stripe curve regions 305 and 306 in which the active stripes are bending gradually along the n-InP substrate 302 at a curvature radius of 4 mm to such an extent that radiation loss can be ignored and moreover 200 μm being the length of the angled optical waveguide regions 307 and 308 which are brought into smooth connection with these active stripe curve regions 305 and 306 and inclined only at 7° in the same direction toward the [110] direction of the n-InP substrate 302. Incidentally, these angled optical waveguide regions 307 and 308 have spot size conversion regions 311 and 312 in which thickness-tapered spot size converter has been made gradually thin to one third of the original thickness over a length of 150 μm toward the facets 309 and 310 from the above described active stripe (active stripe) curve regions 305 and 306. In addition, window regions 313 and 314, in which no active stripe is provided, are provided over 25 μm from the incident and emission facets 309 and 310, respectively, toward the inside of the device. These are all produced by selective MOVPE growth. In addition, low reflection films 315 and 316 with reflection ratio of 0.1% for optical signals are formed on the both facets of the device.

Figure 7:
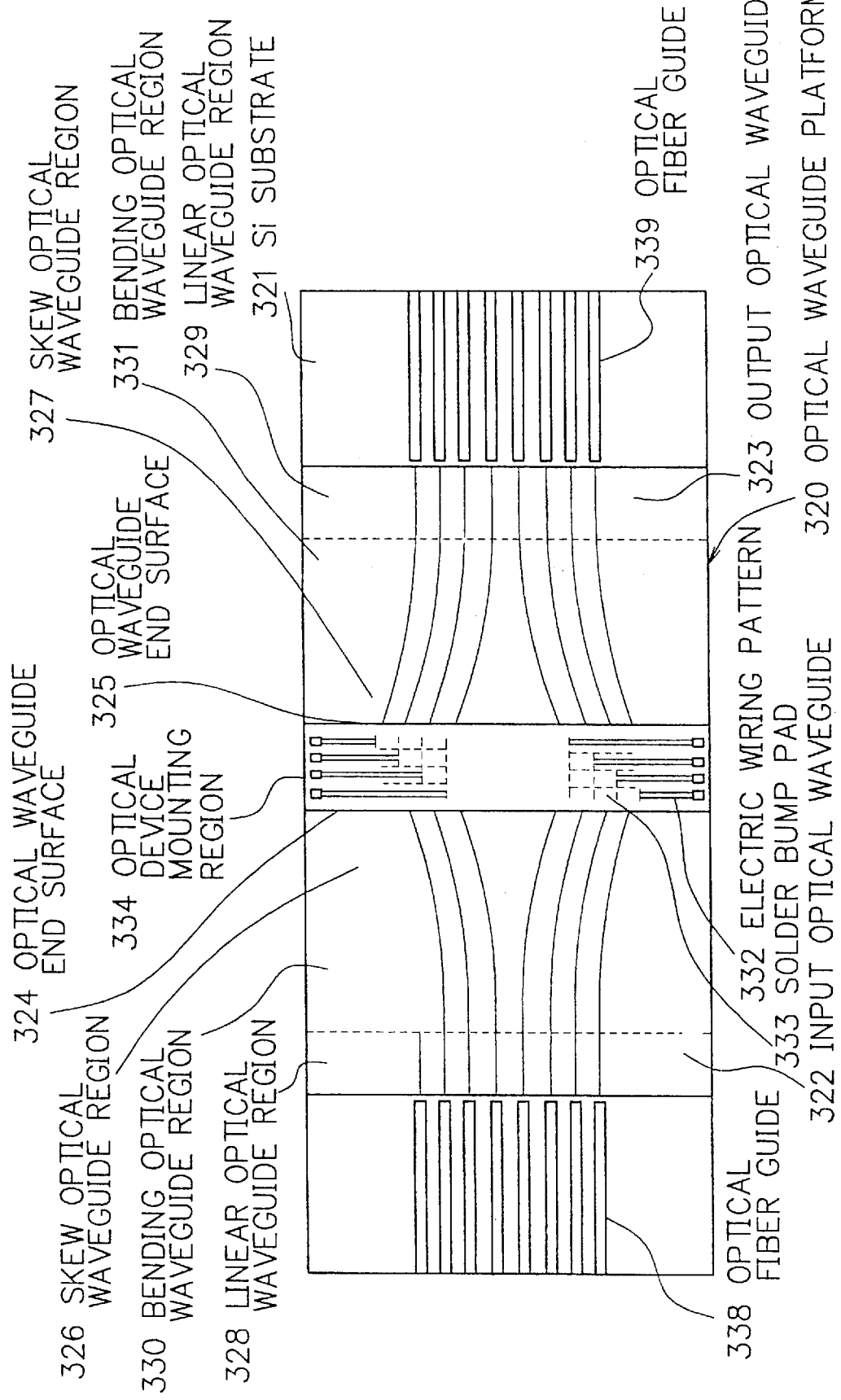
FIG. 7 is a plan block diagram showing an optical waveguide platform in the second embodiment.

FIG. 7 is a plan block diagram of a silica-based optical waveguide platform 320 on which the above described semiconductor amplifier 301 is mounted. In the above described optical waveguide platform 320, eight pieces of input optical waveguide 322 as well as eight pieces of output optical waveguide 323 of silica-based filmed with atmospheric pressure CVD on an Si substrate 321 are formed symmetrically making 2 axis in an array. These input optical waveguide 322 as well as output optical waveguide 323 have a configuration so that a 6-μm squared core in sectional view doped with Ge has been buried with clad layers of thickness of 10 μm upside and downside, and are designed to become a single-mode optical waveguide for a optical signal in 1.55 μm. The above described input optical waveguide 322 as well as output optical waveguide 323 respectively have angled optical waveguide regions 326 and 327 which are bent inside a face horizontal along the Si substrate 321 with approximately 15° toward optical waveguide facets 324 and 325 in order to couple optical signals efficiently toward the above described semiconductor optical-amplifier 301, straight optical waveguide regions 328 and 329 and bending optical waveguide regions 330 and 331 comprising the above described angled optical waveguide regions 326 and 327 and the above described straight optical waveguide regions 328 and 329 being brought into smooth connection respectively and a curve optical waveguide with an appropriate curvature to such an extent that radiation influence can be ignored.

In addition, on the above described Si substrate 321, in order to self-align implement the above described semiconductor optical-amplifier 301 at high aligning accuracy and inject drive currents independently to each channel, electric wiring patterns 332 and solder bump pads 333 are formed with a WSi layer which has been formed by sputtering in advance and electrode filming process after the optical waveguides have been formed at the same time. In addition, between the above described input optical waveguide 322 and the output optical waveguide 323, in order to implement the above described semiconductor optical-amplifier 301, an optical device mounting region 334 where the Si substrate 321 or electrode wiring patterns 332 are exposed is formed over the length of 1.02 mm. In addition, optical waveguide facets 324 and 325 with the input optical waveguide 322 and the output optical waveguide 323 perpendicular to the Si substrate 321 facing this optical device mounting region 334 have been formed by cutting with a dicing blade.

Moreover, at the both ends of the above described optical waveguide platform 320, in order to passively-aligned optical fibers for making the input optical waveguide 322 and the output optical waveguide 323 respectively introduce and emit the optical signals at high aligning accuracy, a total of 16 optical fiber glides 338 and 339, 8 units for the input side and 8 units for the output side, are formed on the Si substrate 321 over a length of 1 mm. These optical fiber guides 338 and 339 is configured to have V-shaped Si grooves in a sectional view that are divided into blocks in the direction of longitudinal axis of optical fibers so that aligning accuracy might not be spoiled when off-axis patterning could be occurred against crystal orientation of the Si substrate.

In addition, in the above described device mounting region 334, two sets of the above described 4-channel arrayed semiconductor optical-amplifiers 301 have been mounted (bonded) with AuSn solder bumps in flip-chip manner in axis symmetry between the above described optical waveguide facets 324 and 325 being provided with a gap of 10 μm width. In addition, along these 16 optical fiber guides in total, 16 single-mode optical fibers 336 and 337 in total are passive-aligned.

In the hybrid optical integrated module of this semiconductor optical-amplifier, the optical coupling loss between the input optical waveguide 322 as well as the output optical waveguide 323 and the array semiconductor optical amplifier 301 were both 4.5 dB, and likewise the optical coupling loss between the input optical waveguide 322 as well as the output optical waveguide 323 and the single-mode optical fibers 336 and 337 were both 0.3 dB. Under module temperature of 25° C., an optical signal with wavelength of 1.55 μm and power of 0 dBm being inputted respectively to eight input optical fibers 336 and a forward current of 20 mA being injected to channels of the semiconductor optical-amplifier respectively corresponding with the input optical fibers 336, giving rise to 0 dB being gain of the optical signal extracted from the optical fibers 337 in the output side corresponding therewith. In addition, injection of current of 40 mA could give rise to optical signal gain of 10 dB on each channel. In addition, for each channel, the optical signal was outputted subject to attenuation of 60 dB at the time when no currents were injected. In case of range of injected currents being 0 to 40 mA, 70 dB as an ON-OFF ratio of output optical signal was obtained for each channel. In addition, when the above described optical signal was inputted to a certain channel and the output signal from such a channel that did not correspond with this was measured, it was found out that the output was subject to attenuation of 80 dB or more. These results are enough to suppress coherent crosstalk of optical signals. Moreover, when each channel of the array semiconductor optical-amplifier 301 was driven at a high speed with driving currents of amplitude of 0 to 40 mA and rise and fall times each of 1 nsec respectively, high speed optical gate operation following this driving current waveform was obtained.

Figure 8:
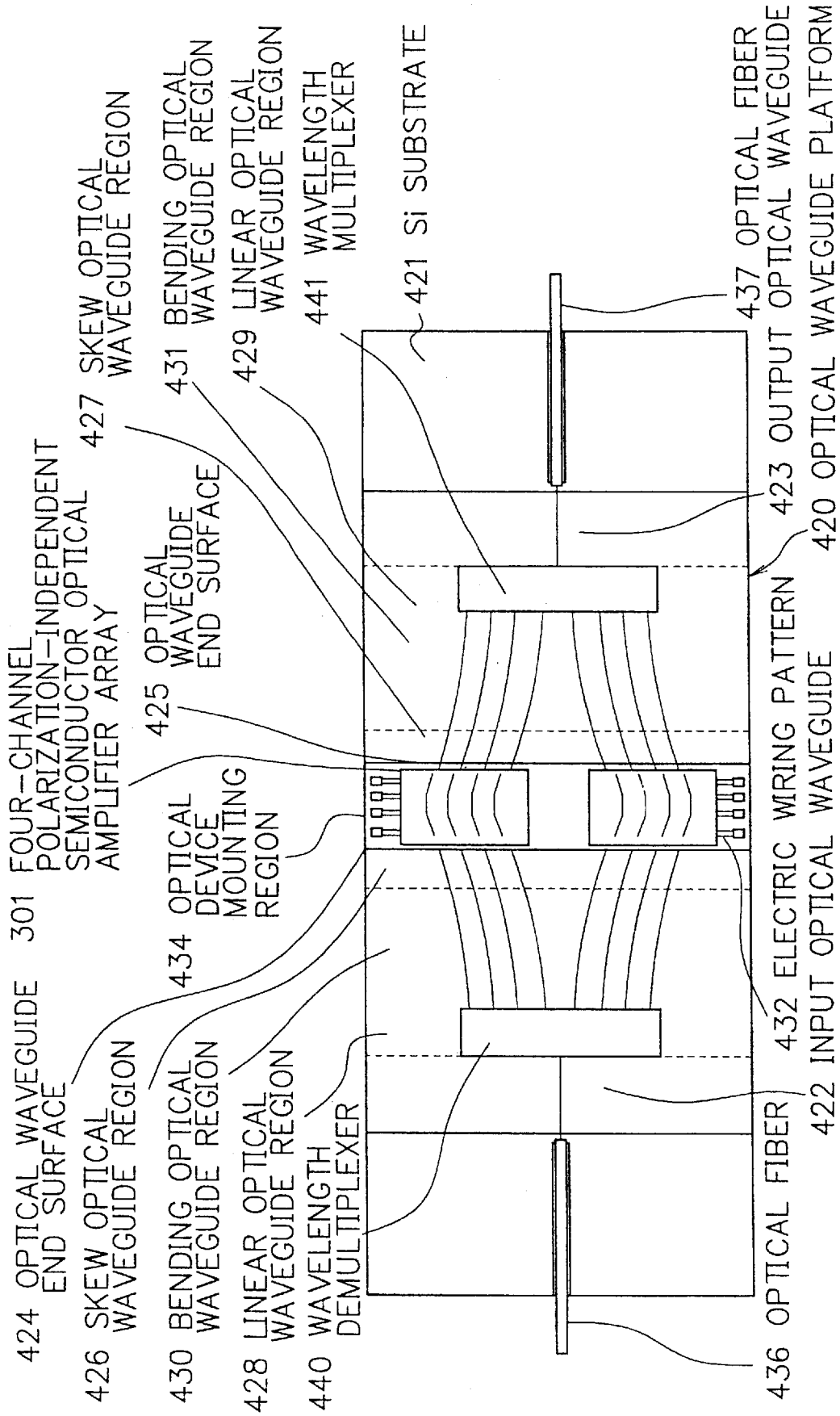
FIG. 8 is a plan block diagram showing an optical integrated module of a third embodiment of the present invention.

FIG. 8 is a plan block diagram of a third embodiment which the present invention has been applied to an optical fiber integrated 8 channel wavelength selector module in which array semiconductor optical-amplifier 301 has been hybrid-optically integrated on an optical waveguide Si platform 420 in which arrayed silica-based optical waveguide, wavelength multiplexer and wavelength demultiplexer have been formed. Since the above described semiconductor optical-amplifier array 301 is exactly the same as that which was used in the above described second embodiment, detailed description thereon will be omitted.

Figure 9:
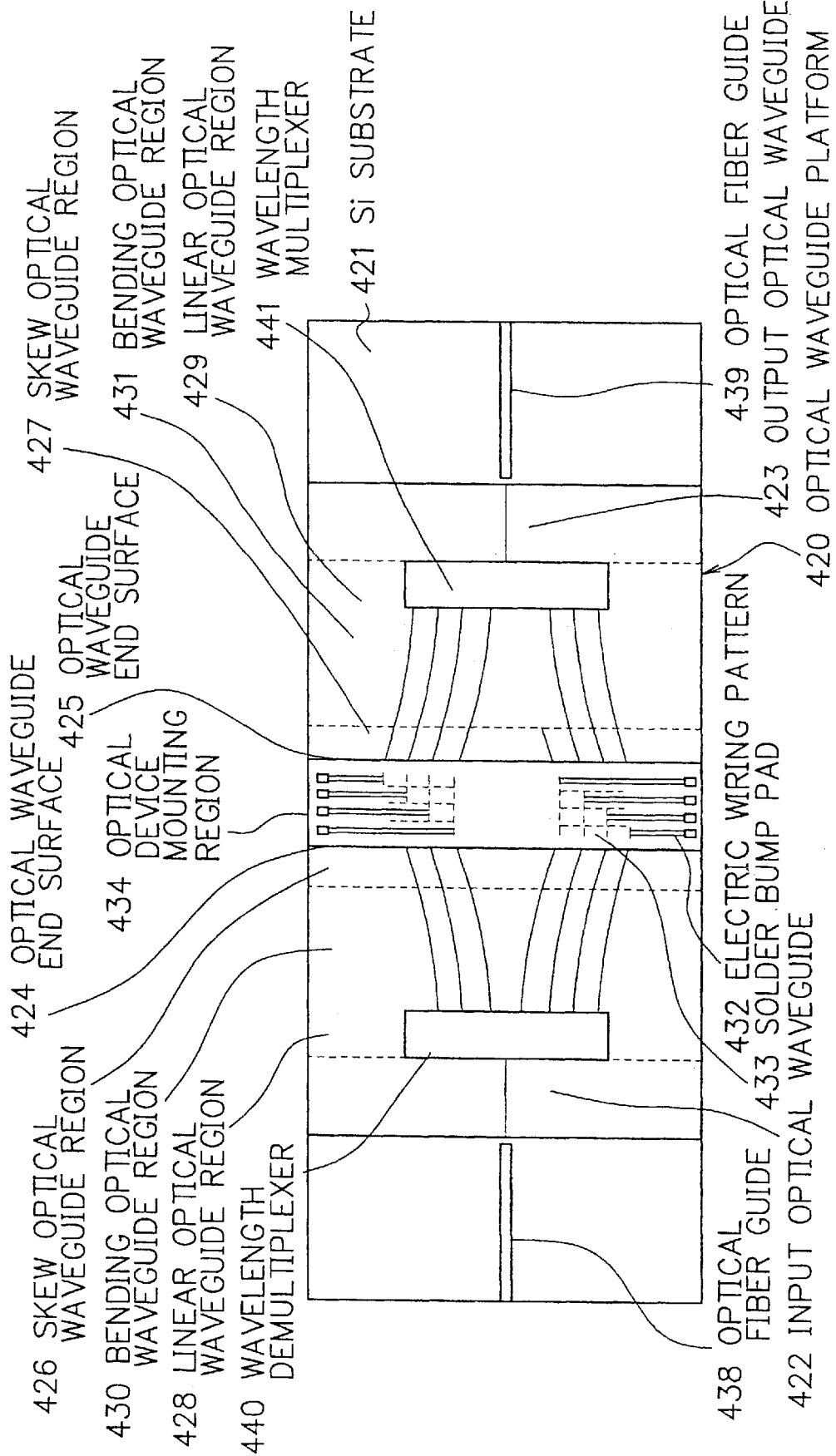
FIG. 9 is a plan block diagram showing an optical waveguide platform in the third embodiment.
Figure 10:
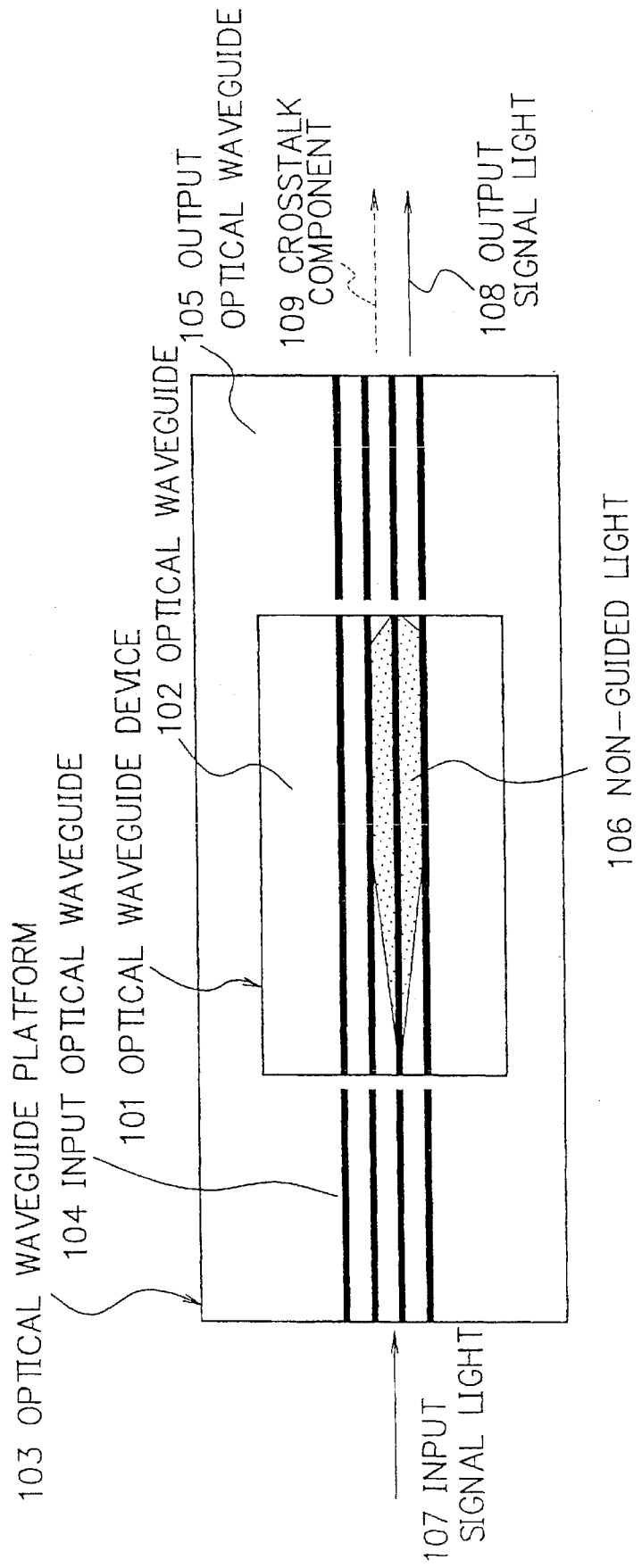
FIG. 10 is a plan block diagram showing an example of a prior art optical integrated module.
Figure 11:
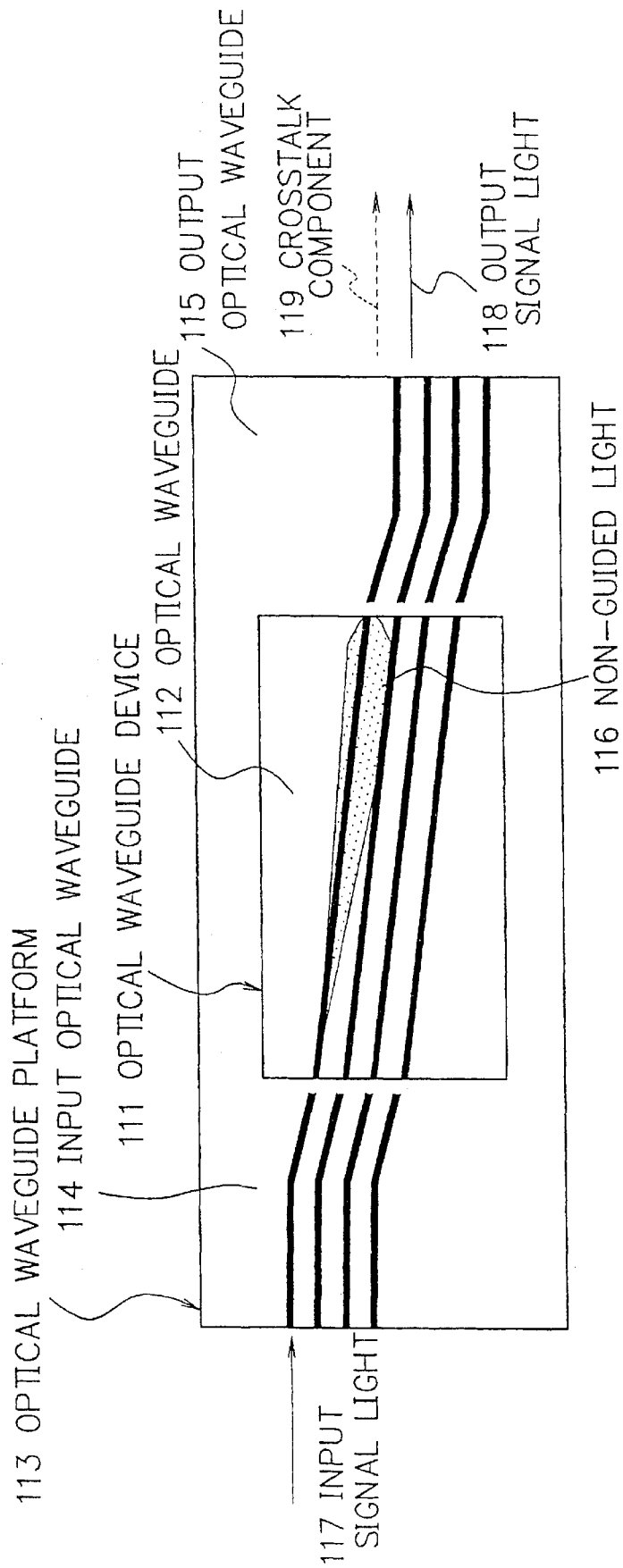
FIG. 11 is a plan block diagram showing another example of a prior art optical integrated module.
Figure 12:
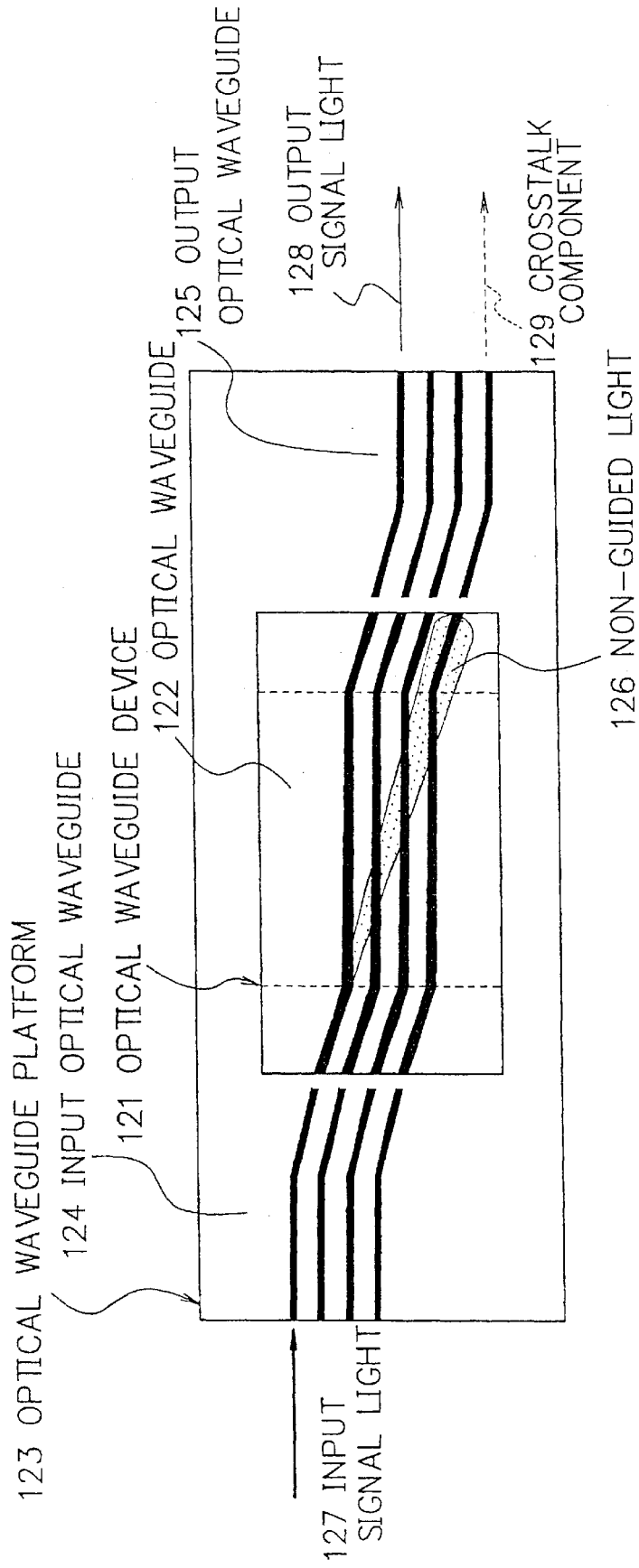
FIG. 12 is a plan block diagram showing still another example of a prior art optical integrated module.

FIG. 9 is a plan block diagram of the above described silica-based optical waveguide platform 420. The optical waveguide platform 420 is an optical waveguide platform configured like the second embodiment with 1:8 wavelength demultiplexer 440 and 8:1 wavelength multiplexer 441 having been produced thereon. These function to bring an optical signal of a wavelength of 1.55 μm band into 8:1 wavelength separation as well as 1:8 wavelength multiplex. Incidentally, optical signal that undergoes wavelength multiplexing-demultiplexing by these has adjacent wavelength interval of approximately 0.8 nm (100 GHz in terms of optical frequency) and the wavelength pass region for the both parties coincide. Incidentally, since configuration of the above described optical waveguide platform 420 on points other than these is the same as in the second embodiment, detailed description thereof will be omitted. However, since optical fibers which are brought into connection with the above described wavelength demultiplexer 440 as well as wavelength multiplexer 441 are respectively one piece, only one of optical fiber guides 438 and 439 has been respectively provided for each.

In addition, as described above, in the above described device mounting region 434 of the above described optical waveguide platform, two sets of 4-channel semiconductor optical-amplifier arrays 301 have been implemented with AuSn solder in axis symmetry between the above described optical waveguide facets 424 and 425 being provided with a gap of 10 μm width. In addition, along the optical fiber guides 438 and 439, two single-mode optical fibers 436 and 437 are passive-aligned.

In this optical fiber integrated 8-channel wavelength selector module, when under module temperature of 25° C., 8-wavelength-channel multiplexed optical signals which corresponded with pass bands of the wavelength multiplexer and the wavelength multiplexer and were mutually different were brought into wavelength multiplex and inputted to the optical fibers 436 at the input side so that forward current of 30 mA was inputted only to one particular channel among channels of the semiconductor optical-amplifier corresponding with respective optical signal wavelengths, only optical signals of wavelengths which were able to pass this channel were outputted from the optical fibers 437 at the output side. In addition, optical signal gain at that time was 0 dB. In addition, optical signal gain of 5 dB was obtained with injection of current of 50 mA. In addition, on each channel, at the time when no currents were injected, optical signal was outputted subject to attenuation of 70 dB. In the case where injection current falls within the range of 0 to 50 mA, 75 dB was obtained for each wavelength cannel as ON-OFF ratio of output optical signal. In addition, when mutually different 8-wavelength-channel multiplexed optical signal were brought into wavelength multiplex and were inputted and likewise forward current of 30 mA was injected only to a particular one channel, it turned out that the optical signal of wavelength cannel which did not correspond with this was outputted subject to attenuation of not less than 80 dB. These results are sufficient values for controlling coherence crosstalk of optical signals. In addition, when mutually different 8-wavelength-channel multiplexed optical signals were brought into wavelength multiplex and were inputted, and likewise driving current of amplitude of 0 to 40 mA and rise and fall time each of 1 nsec was applied to only one particular channel to drive at a high speed, it operated as a wavelength selector to rapidly select only one corresponding wavelength following this driving current waveform.

Incidentally, the hybrid optical integrated module of the present invention shall not be limited to the above described configuration, but any photonic integrated circuit module which is configured with the optical waveguide device being disposed between the input optical waveguide and the output optical waveguide, where the above described input optical waveguide and the output waveguide having basic configuration of the present invention, can be applied to various optical integrated modules. In addition, it goes without saying that the number of channels configured with optical waveguides is not limited to the configuration of the above described respective embodiments.

In addition, in the present invention, an embodiment such as the following one is possible. That is, it is an electric field absorption type semiconductor optical transformer in which the optical waveguide device realizes light absorption function with voltage application for optical signals being transmitted here. In addition, the optical waveguide device comprises at least one or more current injection mechanism or voltage application mechanism.

In addition, the optical waveguide platform comprises some electric wiring other than the electric wiring configuring the solder bump. The optical waveguide platform comprises thereon electric devices and end resistant, etc. for the purpose of driving and the like of the optical waveguide device. It also comprises a receptacle mechanism for coupling optical signals via optical fibers toward the input optical waveguide as well as the output optical waveguide on the optical waveguide platform and moreover for detaching and attaching this optical fibers toward this optical waveguide platform.

Moreover, the input optical waveguide or the output optical waveguide in the optical waveguide platform comprises a function as optical isolator which transmits the optical signals transmitting these from the input optical waveguide side toward the output optical waveguide side in one way direction. The input optical waveguide or the output optical waveguide comprises a function as optical filter comprising a periodic structure such as diffraction grating, etc. The input optical waveguide or the output optical waveguide comprises an optical waveguide directional coupler. The input optical waveguide or the output optical waveguide comprises a mechanism to implement phase control of the optical signals getting wave-guided here. The input optical waveguide or the output optical waveguide includes rare-earth elements for amplifying optical signals getting wave-guided. The input optical waveguide or the output optical waveguide comprises array optical waveguide diffraction grating.

Moreover, any of the input optical waveguide, the output optical waveguide and the optical waveguide device comprises functions to detect, observe or control power of the optical signals wave-guiding these and polarized lights. The input optical waveguide, the output optical waveguide and the optical waveguide device, etc. comprise means to observe temperature of those which are formed or implemented on the optical waveguide platform or means for controlling temperature.

INDUSTRIAL APPLICABILITY

As described so far, in the present invention, since both bending direction on a optical signal incident and emission facet of optical waveguide of an optical waveguide device and bending direction of an input optical waveguide and an output optical waveguide formed in an optical waveguide platform are bent toward the same side toward the direction of longitudinal axis of the optical waveguide platform, the unguided optical signal will not be directed to an output optical waveguide, but will be emitted toward outside a substrate of the optical waveguide device, and thereby it will become possible to obtain a hybrid optical integrated module which suppresses deterioration of ON-OFF ratio due to unguided optical signal as much as possible. In addition, at the same time, in the case where photonic integrated array module has been configured, such structure which suppresses unguided optical signal to be leaked into other channels and become crosstalk component between channels can be obtained. Moreover, since resonance inside the optical waveguide device is controlled effectively, optical signal gain inside the optical waveguide device can be made larger, and it will become possible that an photonic integrated circuit module is structured by mounting thereon in particular even such an optical waveguide device as a semiconductor optical-amplifier having optical signal gain. Accordingly, the hybrid optical integrated module according to the present invention will provide means to satisfy high ON/OFF characteristics, low channel-to-channel crosstalk and high optical signal gain at the same time at the time when in particular even such an optical waveguide device as a semiconductor optical-amplifier having optical signal gain is brought into hybrid optical integration, and will enable miniaturization and high-performance of optical gate device, etc. to be used in optical ATM switch for light wave network and the like to be realized.

What is claimed is:

1. An optical integrated module comprising a rectangular optical waveguide platform on which an input optical waveguide and an output optical waveguide are respectively formed toward the longitudinal direction and an optical waveguide device which is mounted on said optical waveguide platform between said input optical waveguide and the output optical waveguide, and is brought into optical coupling with said input optical waveguide and the output optical waveguide, characterized in that said input optical waveguide, the output optical waveguide and the optical waveguide device are disposed in such a positional relationship that certain limited gaps are provided between said input optical waveguide and said optical waveguide device, and between said output optical waveguide and said optical waveguide device respectively so that discontinued portions of optical waveguides are formed between them, and said input optical waveguide, the optical waveguide device and the output optical waveguide respectively comprise portions which are respectively bent at a gentle curvature to such an extent that radiation of optical signals to be guided can be sufficiently ignored, and adjacent parts of said input optical waveguide, the output optical waveguide, and the optical waveguide of said optical waveguide device which is brought into optical coupling with these optical waveguides are bent in the same direction in the vicinity of said discontinuity of the optical waveguide with respect to a straight line in the longitudinal direction of said optical waveguide platform to comprise angled facet structure, and said optical waveguide platform comprises an optical fiber aligning guide for aligning an optical fiber to optically couple the optical signals into the input optical waveguide and the output optical waveguide.

2. An optical integrated module comprising a rectangular optical waveguide platform on which an input optical waveguide and an output optical waveguide are respectively formed toward the longitudinal direction and an optical waveguide device which is mounted on said optical waveguide platform between said input optical waveguide and the output optical waveguide, and is brought into optical coupling with said input optical waveguide and the output optical waveguide, characterized in that said input optical waveguide, the output optical waveguide and the optical waveguide device are disposed in such a positional relationship that certain limited gaps are provided between said input optical waveguide and said optical waveguide device, and between said output optical waveguide and said optical waveguide device respectively so that discontinued portions of optical waveguides are formed between them, and said input optical waveguide, the optical waveguide device and the output optical waveguide respectively comprise portions which are respectively bent at a gentle curvature to such an extent that radiation of optical signals to be guided can be sufficiently ignored, and adjacent parts of said input optical waveguide, the output optical waveguide, and the optical waveguide of said optical waveguide device which are brought into optical coupling with these optical waveguides are bent in the same direction in the vicinity of said discontinuity of the optical waveguide with respect to a straight line in the longitudinal direction of said optical waveguide platform to comprise angled facet structure, and said optical waveguide platform comprises an optical fiber aligning guide for aligning an optical fiber to optically couple the optical signals into the input optical waveguide and the output optical waveguide, and said optical waveguide device is formed like a plurality of arrays on the same substrate, and moreover said input optical waveguide and the output optical waveguide are formed like an array on the same optical waveguide platform so as to correspond with the optical waveguide of said optical waveguide device.

3. The optical integrated module according to claim 2, characterized in that said input optical waveguide, the output optical waveguide and the optical waveguide device have characteristics of polarization-insensitive for propagating optical signal.

4. The optical integrated module according to claim 3, characterized in that said input optical waveguide and the output optical waveguide are a silica-based optical waveguide or a polymer optical waveguide formed on the same glass substrate or the same silicon substrate, or silicon germanium optical waveguide formed on the same silicon substrate.

5. The optical integrated module according to claim 3, characterized in that said input optical waveguide comprises an optical demultiplexer and said output optical waveguide comprises an optical multiplexer.

6. The optical integrated module according to claim 2, characterized in that said input optical waveguide and the output optical waveguide are silica-base optical waveguides or polymer optical waveguides formed on the same glass substrate or the same silicon substrate, or silicon germanium optical waveguides formed on the same silicon substrate.

7. The optical integrated module according to claim 2, characterized in that said input optical waveguide comprises an optical demultiplexer and said output optical waveguide comprises an optical multiplexer.

8. An optical integrated module comprising a rectangular optical waveguide platform on which an input optical waveguide and an output optical waveguide are respectively formed toward the longitudinal direction and an optical waveguide device which is mounted on said optical waveguide platform between said input optical waveguide and the output optical waveguide, and is brought into optical coupling with said input optical waveguide and the output optical waveguide, characterized in that said input optical waveguide, the output optical waveguide and the optical waveguide device are disposed in such a positional relationship that certain limited gaps are provided between said input optical waveguide and said optical waveguide device, and between said output optical waveguide and said optical waveguide device respectively so that discontinued portions of optical waveguides are formed between them, and said input optical waveguide, the optical waveguide device and the output optical waveguide respectively comprise portions which are respectively bent at a gentle curvature to such an extent that radiation of optical signals to be guided can be sufficiently ignored, and adjacent parts of said input optical waveguide, the output optical waveguide, and the optical waveguide of said optical waveguide device which are brought into optical coupling with these optical waveguides are bent in the same direction in the vicinity of said discontinuity of the optical waveguide with respect to a straight line in the longitudinal direction of said optical waveguide platform to comprise angled facet structure, and said optical waveguide platform comprises an optical fiber aligning guide for aligning an optical fiber to optically couple the optical signals into the input optical waveguide and the output optical waveguide, and moreover said input optical waveguide and the output optical waveguide are a silica-based optical waveguide or a polymer optical waveguide formed on the same glass substrate or the same silicon substrate, or silicon germanium optical waveguide formed on the same silicon substrate.

9. An optical integrated module comprising a rectangular optical waveguide platform on which an input optical waveguide and an output optical waveguide are respectively formed toward the longitudinal direction and an optical waveguide device which is mounted on said optical waveguide platform between said input optical waveguide and the output optical waveguide, and is brought into optical coupling with said input optical waveguide and the output optical waveguide, characterized in that said input optical waveguide, the output optical waveguide and the optical waveguide device are disposed in such a positional relationship that certain limited gaps are provided between said input optical waveguide and said optical waveguide device, and between said output optical waveguide and said optical waveguide device respectively so that discontinued portions of optical waveguides are formed between them, and said input optical waveguide, the optical waveguide device and the output optical waveguide respectively comprise portions which are respectively bent at a gentle curvature to such an extent that radiation of optical signals to be guided can be sufficiently ignored, and adjacent parts of said input optical waveguide, the output optical waveguide, and the optical waveguide of said optical waveguide device which are brought into optical coupling with these optical waveguides are bent in the same direction in the vicinity of said discontinuity of the optical waveguide with respect to a straight line in the longitudinal direction of said optical waveguide platform to comprise angled facet structure, and said optical waveguide platform comprises an optical fiber aligning guide for aligning an optical fiber to optically couple the optical signals into the input optical waveguide and the output optical waveguide, and said optical waveguide device is formed like a plurality of arrays on the same substrate, and moreover said input optical waveguide and the output optical waveguide are formed like an array on the same optical waveguide platform so as to correspond with the optical waveguide of said optical waveguide device, and said input optical waveguide, the output optical waveguide and the optical waveguide device have characteristics of polarization-insensitive for propagating optical signals.

10. A photonic integrated module comprising a rectangular optical waveguide platform on which a plurality of input optical waveguides and output optical waveguides are respectively formed toward the longitudinal direction and an optical waveguide device which is mounted on said optical waveguide platform between said input optical waveguides and the output optical waveguides, and is brought into optical coupling with said input optical waveguides and the output optical waveguides, characterized in that said input optical waveguide, the output optical waveguide and the optical waveguide device are disposed in such a positional relationship that certain limited gaps are provided between said input optical waveguide and said optical waveguide device, and between said output optical waveguide and said optical waveguide device respectively so that discontinued portions of optical waveguides are formed between them, and said input optical waveguide, the optical waveguide device and the output optical waveguide respectively comprise portions which are respectively bent at a gentle curvature to such an extent that radiation of signal lights to be guided can be sufficiently ignored, and adjacent parts of said input optical waveguide, the output optical waveguide, and the optical waveguide of said optical waveguide device which is brought into optical coupling with these optical waveguides are bent in the same direction in the vicinity of said discontinuation of the optical waveguide with respect to a linear line in the longitudinal direction of said optical waveguide platform to comprise skew end surface structure.

11. The optical integrated module according to claim 10, characterized in that said optical waveguide device comprises a low reflection film on at least one of light incident and emission facets.

12. The optical integrated module according to claim 10, characterized in that said optical waveguide device comprises a spot size conversion mechanism.

13. The optical integrated module according to claim 10, characterized in that said optical waveguide device comprises window facet structure in the vicinity of light incident and emission facets.

14. The optical integrated module according to claim 10, characterized in that said optical waveguide device is a semiconductor optical-amplifier providing for wave-guided optical signals an optically amplifying function with current injection and optical absorption function at the time when no currents is injected.

15. The optical integrated module according to claim 10, characterized in that said limited gap portions are filled with dielectric substance.

* * * * *